(12) United States Patent
Li et al.

(10) Patent No.: US 11,357,235 B2
(45) Date of Patent: Jun. 14, 2022

(54) PIG BODY SCALDING SYSTEM

(71) Applicant: NANJING AGRICULTURAL UNIVERSITY, Jiangsu (CN)

(72) Inventors: Chunbao Li, Nanjing (CN); Guanghong Zhou, Nanjing (CN); Guangjie He, Nanjing (CN); Bo Zou, Nanjing (CN); Xinglian Xu, Nanjing (CN); Kequan Yu, Nanjing (CN)

(73) Assignee: NANJING AGRICULTURAL UNIVERSITY, Nanjing (CN)

( * ) Notice: Subject to any disclaimer, the term of this patent is extended or adjusted under 35 U.S.C. 154(b) by 0 days.

(21) Appl. No.: 17/056,129

(22) PCT Filed: Nov. 6, 2018

(86) PCT No.: PCT/CN2018/114174
§ 371 (c)(1),
(2) Date: Nov. 17, 2020

(87) PCT Pub. No.: WO2020/037834
PCT Pub. Date: Feb. 27, 2020

(65) Prior Publication Data
US 2021/0378250 A1 Dec. 9, 2021

(30) Foreign Application Priority Data

Aug. 23, 2018 (CN) .......................... 201810966737.7
Aug. 23, 2018 (CN) .......................... 201821364675.4

(51) Int. Cl.
*A22B 5/00* (2006.01)
*A22B 5/08* (2006.01)
(52) U.S. Cl.
CPC .............. *A22B 5/08* (2013.01); *A22B 5/0082* (2013.01)

(58) Field of Classification Search
CPC ................................ A22B 5/08; A22B 5/0082
(Continued)

(56) References Cited

U.S. PATENT DOCUMENTS 5,326,308 A 7/1994 Norrie
5,964,656 A * 10/1999 Lawler, Jr. ........... A22B 5/0064
452/173

(Continued)

FOREIGN PATENT DOCUMENTS

CN 102223804 A 10/2011
CN 204540567 U 8/2015
(Continued)

OTHER PUBLICATIONS

Mar. 29, 2019 International Search Report issued in International Patent Application No. PCT/CN2018/114174.

*Primary Examiner* — Richard T Price, Jr.
(74) *Attorney, Agent, or Firm* — Oliff PLC

(57) ABSTRACT

A novel pig body scalding system, includes a scalding pool body. A separating fence in the middle of a scalding region in the scalding pool body divides the scalding region into a high-speed scalding and constant-speed scalding region; moreover, the two sides of the separating fence has a high-speed and a constant-speed scalding track corresponding to the to the high-speed and constant-speed scalding region respectively. The starting end of the high-speed scalding and that of the constant-speed scalding track can be connected with the same wobbling track, and wobbling track is located at the tail end of a pig body hanging track; an infrared thermometer and pressure sensor connected with a control system is provided below the pig body hanging track. The scalding system can perform targeted scalding on (Continued)

each pig body according to the condition of each pig body, thereby greatly reducing the influence of scalding on pork quality.

10 Claims, 2 Drawing Sheets

(58) Field of Classification Search
USPC .......................................... 452/125, 126, 173
See application file for complete search history.

(56) References Cited

U.S. PATENT DOCUMENTS

| | | | | |
|---|---|---|---|---|
| 6,196,912 | B1* | 3/2001 | Lawler, Jr. ........... | A22B 5/0064 |
| | | | | 452/173 |
| 8,070,568 | B1* | 12/2011 | Griffiths ............... | A22B 5/0082 |
| | | | | 452/173 |
| 8,444,459 | B2* | 5/2013 | Van Den Griend ..... | A22B 5/08 |
| | | | | 452/77 |
| 8,905,826 | B2 | 12/2014 | Hayzlett et al. | |
| 2018/0064119 | A1* | 3/2018 | Johnsen ................ | A22B 7/004 |

FOREIGN PATENT DOCUMENTS

| | | |
|---|---|---|
| CN | 205305853 U | 6/2016 |
| CN | 205756944 U | 12/2016 |

* cited by examiner

PIG BODY SCALDING SYSTEM

BACKGROUND

Technical Field

The present invention relates to the technical field of pig slaughtering, more particularly to a novel pig body scalding system capable of performing targeted scalding on each pig body according to the size and temperature of individual pig body, thereby enabling a water temperature of each position of a scalding pool to be more consistent, achieving a more efficient and effective hair-removing, greatly reducing heat loss of the scalding pool, improving the energy utilization rate, reducing labor, and reducing production costs of the slaughterhouses.

Related Art

As a very important technic for pig slaughtering, scalding has significant influence on pork quality and appearance. Scalding is the premise of removing bristles from the surface of a pig body, and the scalding effect is determined by the scalding time and the scalding temperature. At the same time, as the only carcass heating work procedure, scalding has a substantial influence on the meat quality. Scalding refers to immersing an exsanguinated pig body in water at a certain temperature so that pores of the pig skin expand and bristles on the surface are more easily removed. As the premise of hair removal, the scalding effect directly influences proceeding of a subsequent work procedure. Three kinds of scalding are mainly adopted at present, that is, mechanical wobbling scalding, canal immerse scalding and tunnel scalding. As a traditional scalding practice, the mechanical wobbling scalding is low in efficiency and cannot meet the requirements of high productivity. Although the tunnel scalding has a better effect, its high running and equipment costs are faced by slaughterhouses, therefore most slaughtering houses select the canal scalding on the consideration of costs and effects.

However, field investigation reveals that there are many problems in a canal scalding pool used by the slaughterhouses in China: (1) the scalding temperature is not consistent so that PSE pork may be caused; (2) the scalding conditions cannot be suitable for all pigs of different size and weight; (3) the scalding temperature and time completely depend on operators, and have no specific operation specification; and (4) the scalding effect is unstable, so that too many workers are required for scalding and subsequent dehairing, and the production costs are increased.

SUMMARY

The objective of the present invention is to provide a novel pig body scalding system capable of performing targeted scalding on each pig body according to the size and temperature of individual pig bodies, thereby enabling a water temperature of each position of a scalding pool to be more stable, achieving a more efficient and effective hair-removing, greatly reducing heat loss of the scalding pool, improving an energy utilization rate, reducing labor, and reducing production costs of the enterprises by aiming at the problems in the prior art.

The objective of the present invention is achieved by the following technical solution.

A novel pig body scalding system includes a scalding pool body. A separating fence is provided at the middle of a scalding region in the scalding pool body and divides the scalding region into a high-speed scalding region and a constant-speed scalding region. Moreover, two sides of the separating fence are provided with a high-speed scalding track corresponding to the high-speed scalding region and a constant-speed scalding track corresponding to the constant-speed scalding region. The starting end of the high-speed scalding track and that of the constant-speed scalding track are capable of being connected with a same wobbling track, and the wobbling track is located at a tail end of a pig carcass hanging track. An infrared thermometer and pressure sensor connected with a control system is provided below the pig body hanging track. The infrared thermometer and pressure sensor measures a body temperature and a mass of a pig body hung on the track in real time and transmits the body temperature and the mass to the control system. The control system drives the wobbling track to realize butt joint with the high-speed scalding track or the constant-speed scalding track through a control mechanism to make the live pig enter a corresponding scalding region to be scalded.

The high-speed scalding track, the constant-speed scalding track and the pig body hanging track are respectively driven by corresponding driving motors, and each of the driving motors is connected with the control system through a circuit.

At least three steam heating pipes provided with steam valves are distributed in the scalding region in the scalding pool body. A bottom of each of the steam heating pipes is provided with an immersed steam sprayer and is additionally provided with a muffler. The steam valves are connected with the control system through circuits so that the control system is capable of controlling open degrees of the steam valves.

The steam heating pipes are sequentially disposed along front, middle and rear of the scalding region. The front and rear steam heating pipes are located in the high-speed scalding region, and the middle steam heating pipe is located in the constant-speed scalding region.

At least three groups of digital thermometers respectively connected with the control system are provided in the scalding pool body. The digital thermometers are distributed at same intervals in the scalding pool body. The digital thermometer in the high-speed scalding region is located between two steam heating pipes in the region. The digital thermometers in the constant-speed scalding region are located at two sides of the steam heating pipe in the region.

The digital thermometers are dual-channel temperature recorders using k type wires as sensing probes. Temperature measuring sites of the digital thermometers are respectively located at a bottom of the scalding pool body and a surface layer of scalding water in the scalding pool body.

A tail end of the scalding pool body communicates with its head end through a circulating water pipe provided with a circulating water pump. A water flow direction in the circulating water pipe is identical to a moving direction of a scalded pig body, so that a water flow direction in the scalding pool body is opposite to the moving direction of the scalded pig body.

The circulating water pump uses a vertical pipeline hot water centrifugal pump with a flow rate of –m and a pump lift of –m. Moreover, the circulating water pump is connected with the control system through a circuit.

A scalding pool cover is provided on the scalding pool body. Moreover, VIP plates are embedded in the scalding pool body and the scalding pool cover to be used as dampproof heat insulation sandwich layers. Access ways for the scalded live pig and an operation space of the pig body hanging track and a transport track are reserved at two ends of the scalding pool cover.

The control system adopts a Siemens PLC with a model of S-.

Compared with the prior art, the present invention has the following advantages:

The scalding system of the present invention redesigns the conventional canal scalding. The targeted scalding can be performed with the best parameters to assure good quality for each pig body. The detrimental influence of scalding on the meat quality is minimized. The water temperature in each position of the scalding pool can be more stable. The more efficient and effective hair-removing effect is achieved. The heat loss of the scalding pool is greatly reduced. The energy utilization efficiency is improved. The labor and production costs are reduced.

By dividing the scalding region into the high-speed scalding region and the constant-speed scalding region through the separating fence, the scalding system of the present invention prevents interactions caused by different moving speeds of the pig bodies at two sides during scalding. By redesigning the pool body and the pool cover, compared with the traditional scalding pools, the heat loss of the scalding pool of the present invention is reduced by about 80%. By using heat insulation materials, the energy consumption is greatly reduced.

In the figures, 1 denotes scalding pool body; 2 denotes separating fence; 3 denotes high-speed scalding region; 4 denotes high-speed scalding track; 5 denotes constant-speed scalding region; 6 denotes constant-speed scalding track; 7 denotes wobbling track; 8 denotes pig body hanging track; 9 denotes infrared thermometer and pressure sensor; 10 denotes steam valve; 11 denotes steam heating pipe; 12 denotes digital thermometer; 13 denotes circulating water pump; 14 denotes circulating water pipe; 15 denotes scalding pool cover; 16 denotes dampproof heat insulation sandwich layer; and 17 denotes transport track.

DETAILED DESCRIPTION

The present invention is further described below with reference to the accompanying drawings and embodiments.

Figure 1:
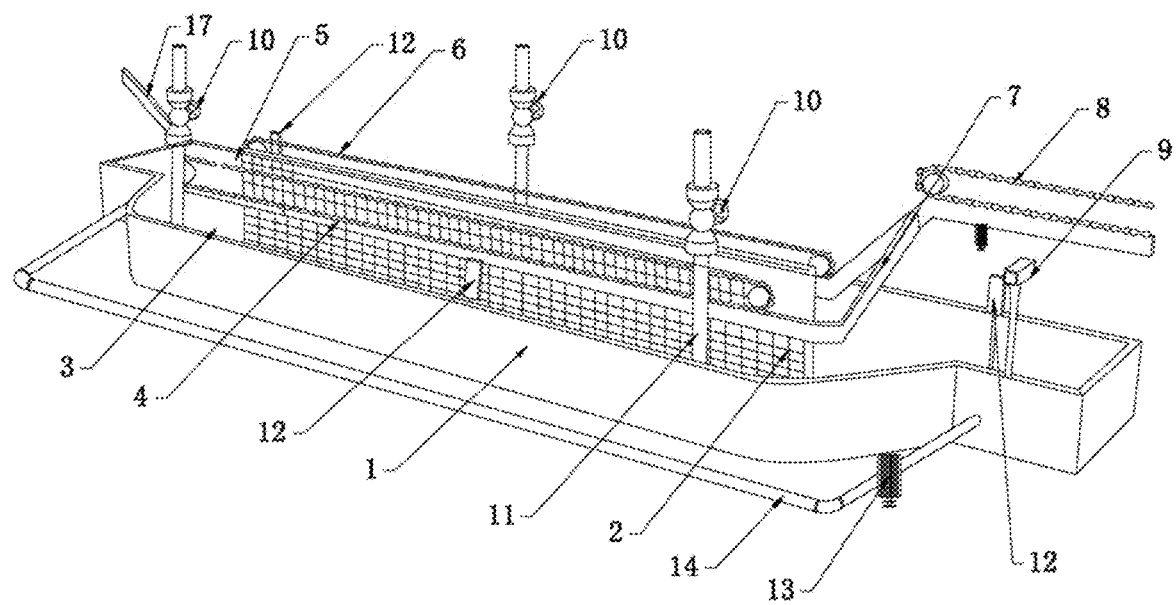
FIG. 1 is a schematic structure diagram of a novel pig body scalding system of the present invention.
Figure 2:
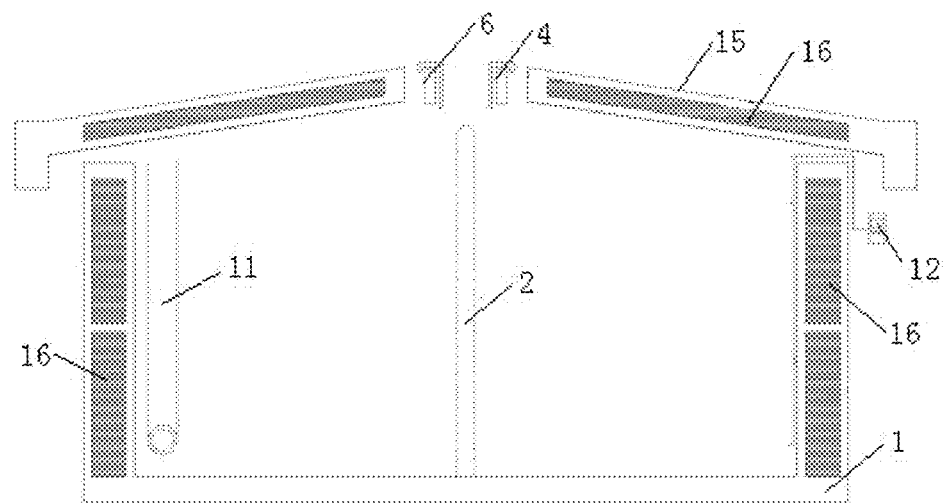
FIG. 2 is a schematic cross-sectional structure diagram of the novel pig body scalding system of the present invention.
Figure 3:
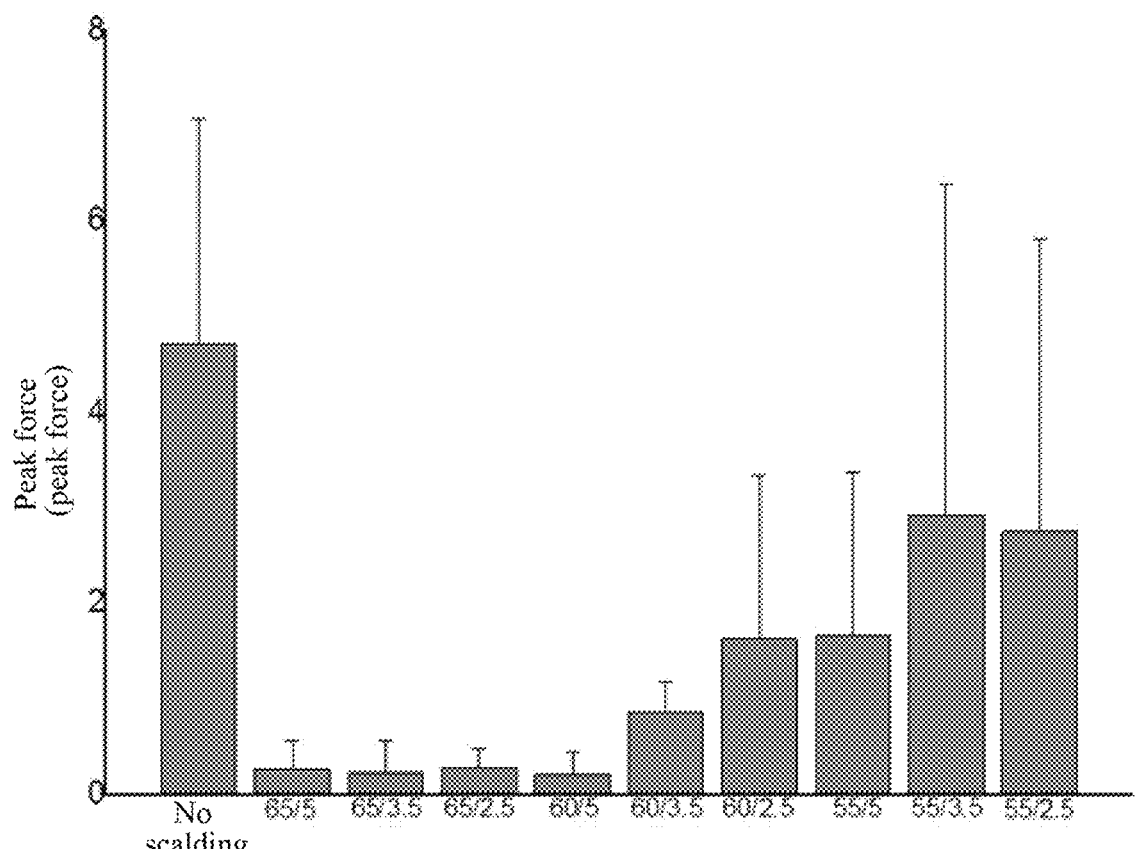
FIG. 3 is a diagram of the novel pig body scalding system of the present invention showing the relationship between peak force for hair removal and scalding temperatures and time.

As shown in FIGS. 1 to 2, a novel pig body scalding system includes a scalding pool body (1). A separating fence (2) is provided at the middle of a scalding region in the scalding pool body (1) and divides the scalding region into a high-speed scalding region (3) and a constant-speed scalding region (5). Moreover, two sides of the separating fence (2) are provided with a high-speed scalding track (4) corresponding to the high-speed scalding region (3) and a constant-speed scalding track (6) corresponding to the constant-speed scalding region (5). A starting end of the high-speed scalding track (4) and that of the constant-speed scalding track (6) are capable of being connected with a same wobbling track (7), and the wobbling track (7) is located at a tail end of a pig body hanging track (8). An infrared thermometer and pressure sensor (9) connected with a control system is provided below the pig body hanging track (8). The high-speed scalding track (4), the constant-speed scalding track (6) and the pig body hanging track (8) are respectively driven by corresponding driving motors, and each of the driving motors is connected with the control system through a circuit. The control system changes operation speeds of the corresponding tracks through the driving motors. An infrared thermometer and pressure sensor (9) measure body temperature and mass of a pig body hung on the track (8) in real time and transmits the body temperature and the mass to the control system. The control system drives the wobbling track (7) to realize butt joint with the high-speed scalding track (4) or the constant-speed scalding track (6) through a control mechanism to make the pig body enter a corresponding scalding region. Moreover, a tap water inlet is provided above the scalding pool body (1) and is configured to supplement a water level of the scalding pool at ordinary times. At a tail of the scalding pool, a pig body is lifted away from the scalding pool by a transport track (17) to enter a hair-removing machine to be subjected to hair-removing operation.

On the basis of the above structure, at least three steam heating pipes (11) provided with steam valves (10) are distributed in the scalding region in the scalding pool body (1). A bottom of each of the steam heating pipes (11) is provided with an immersed steam sprayer and is additionally provided with a muffler. The steam valves (10) are connected with the control system through circuits so that the control system is capable of controlling open degrees of the steam valves (10). The steam heating pipes (11) are sequentially disposed along front, middle and rear of the scalding pool. The front and rear steam heating pipes (11) are located in the high-speed scalding region (3), and the middle steam heating pipe (11) is located in the constant-speed scalding region (5). At least three groups of digital thermometers (12) connected with the control system are provided in the scalding pool body (1). The digital thermometers (12) are distributed at same intervals in the scalding pool body (1). The digital thermometer (12) in the high-speed scalding region (3) is located between two steam heating pipes (11) in the region, and the digital thermometers (12) in the constant-speed scalding region (5) are located at two sides of the steam heating pipe (11) in the region. The digital thermometers (12) are dual-channel temperature recorders using k type wires as sensing probes, and temperature measuring sites are located at a bottom and a surface layer of scalding water in the scalding pool body (1). The digital thermometers (12) should be waterproof and dampproof. Data obtained by the digital thermometers (12) are transmitted to the control system. The control system controls open degrees of the three steam valves (10) through analysis on the data to realize continuous control on the temperature of the scalding pool.

A tail end of the scalding pool body (1) communicates with ahead end of the scalding pool body (1) through a circulating water pipe (14) provided with a circulating water pump (13). A water flow direction in the circulation water pipe (14) is identical to a moving direction of a scalded pig body, so that a water flow direction in the scalding pool body (1) is opposite to the moving direction of the scalded pig body. The circulating water pump (13) uses a vertical pipeline hot water centrifugal pump with a flow rate of 1 to 1200 m$^3$ and a pump lift of 8 to 150 m. The circulating water pump (13) is connected with the control system through a circuit.

Additionally, a scalding pool cover (15) is provided on the scalding pool body (1) so as to reduce heat lost caused by heat radiation. Vacuum insulated panel (VIP) plates are embedded in the scalding pool body (1) and the scalding pool cover (15) made of stainless steel to be used as dampproof heat insulation sandwich layers (16). Compared with a traditional heat insulation material, the VIP plates have the dual advantages of environment protection and energy saving. A thickness is greatly reduced and an excellent dampproof function is realized while a heat insulation effect is ensured. Access ways for the scalded pig body and an operation space of the pig body hanging track (8) and the transport track (17) are reserved at two ends of the scalding pool cover (15).

The above control system adopts a Siemens PLC with a model of S7-200.

During specific application, generally, the scalding pool with a pool wall surface made of stainless steel has a length of 25 m, a width of 3 m, and a volume of about 50 m$^3$, is in a D shape, has a front end and tail end width of 1.5 m, a middle width of 3 m, and is provided with two scalding tracks. The separating fence 2 divides the whole scalding pool into two parallel scalding tracks. The pig body is moved from one end of the scalding pool to the other end by the scalding tracks in an immersed state to complete the whole scalding process. In the scalding pool, three steam heating openings are provided, are located at the front end, the middle end and the tail end of the scalding pool, and are configured to heat the whole scalding pool. Three sets of thermometers are provided at the front end, the middle and the tail end of a water tank. Each temperature measuring probe is provided at a pool wall, and includes two sites (located at the pool bottom and the pool surface). A tap water inlet is provided above the water tank and is configured to supplement a water level of the scalding pool at ordinary times. At the tail end of the scalding pool, the carcass is lifted away from the scalding pool to enter the hair-removing machine to be subjected to hair-removing operation.

Before scalding is started, the scalding pool is enabled to enter a work state. The steps include: (I) a water supplementing opening is opened to make the water level in the scalding pool exceed a pig blocking plate, so as to meet the lowest scalding requirement; (II) the steam valves (10) are opened to make the water temperature in the scalding pool rise until the scalding conditions are met; and (III) through temperature data monitored by the digital thermometers (12), the control system controls the open-closed state of each steam valve (10) and the on-off state of the circulating water pump (13), so as to make the temperature be stabilized in an interval required for scalding. Additionally, before scalding is started, the following parameters should be well set: (I) before scalding is started, the temperature of the scalding pool should be maintained at 60° C. for scalding; (II) during scalding, the total scalding time of the constant-speed scalding track (6) should be set to be 3.5 min, and the total scalding time of the high-speed scalding track (4) should be set to be 3.0 min.

A specific work process of the scalding pool of the present invention is as follows: before scalding is started, the scalding pool is fully filled with water through a water supplementation system. The control system controls the three steam valves (10) to be opened to start to heat water in the scalding pool. Steam directly enters the water tank for heating from nozzles additionally provided with steam heating mufflers. The steam utilization rate is improved in a mode of increasing the contact area. Moreover, the heating is more uniform. The three digital thermometers (12) can maintain the continuous monitoring on the water temperature of the whole scalding pool. Before scalding is started, the water temperature is raised in a steam direct heating mode. After the water temperature reaches a set temperature, the three thermometers (12) continuously monitor temperature data, and the open-closed state of the three steam valves (10) is controlled based on the temperature data. The assassinated and exsanguinated pig body is hung and conveyed to the front part of the scalding pool through the pig body hanging track (8). The surface temperature and the mass of the pig body are measured by the infrared thermometer and pressure sensor (9). Data detected by the probes is uploaded into the control system. The control system judges the scalding type to be performed on the pig body according to the body surface temperature and the mass. The control system issues a corresponding instruction to control the wobbling track (7), and determines the track to be entered by the pig body. The pig body with a higher temperature enters the high-speed scalding track (4) so as to reduce detrimental influence of scalding on the meat quality to the maximum degree. The carcass with a normal temperature is subjected to constant-speed scalding.

The steam heating pipes (11) for heating are provided in the scalding pool. The temperature measuring probes are provided on three points of the scalding pool. According to the obtained data, the control system controls the opening of the three steam heating pipes (11), so as to achieve the goal of controlling the temperature of the whole scalding pool. On the design of the pool wall, materials with high-heat-insulation coefficients, such as VIP plates are used as sandwich layers, so that the heat loss in the whole scalding process is effectively reduced. The surface temperature of the carcass is measured in front of the scalding pool by the infrared thermometer, and whether the carcass enters the high-speed scalding region or the constant-speed scalding region is determined by a pulling rod. The two tracks are divided into the high-speed scalding track and the conventional scalding track. The pig body with the higher surface temperature enters the high-speed scalding track (4). The pig body with the normal surface temperature enters the constant-speed scalding track (6).

The peak force required by hair removal is measured on pig skin samples subjected to different scalding treatment hereafter to obtain scalding parameters of the scalding system of the present invention.

Experiments

Materials: skin obtained from the exsanguinated pigs.

Methods: The pig body skin was divided into squares of 15 cm×15 cm, and stored at the room temperature. A constant-temperature water bath kettle was used to simulate the scalding pool. Different scalding time and scalding temperatures were simulated. Various scalding modes were compared by measuring the peak force. The temperatures were set to 55° C., 60° C. and 65° C. The scalding time was set to 2.5 min, 3.5 min and 5 min. After simulated scalding was completed, the scalded skin was fixed. The peak force required by pulling down bristles was measured by an instrument. Each group was repeatedly operated for 12 times.

Results of simulated scalding experiments showed that when the scalding temperature was 65° C., no obvious difference existed among the three scalding time periods. When the scalding temperature was 60° C., and the scalding time was 3.5 min, no obvious difference existed from 65° C. scalding. When the scalding time was 2.5 min, the force required for hair removal was greatly increased. After the scalding temperature was further reduced, the force required for hair removal was further increased. Therefore, 60° C. and 3.5 min were selected to be used as the conventional scalding time and temperature.

The scalding system of the present invention redesigns the conventional canal scalding. The scalding system is obtained. A conventional canal scalding pool is greatly optimized. Inconsistent scalding effects caused by temperature instability of the scalding pool are reduced. Energy waste caused by an unreasonable design is reduced. The targeted scalding on each pig body according to the condition of each pig body can be performed. The influence of scalding on the meat quality is greatly reduced. The water temperature can be more stable. The more efficient and effective hair-removing effect is achieved. The heat loss of the scalding pool is greatly reduced. The energy utilization efficiency is improved. The labor and the production costs are reduced. By dividing the scalding region into the high-speed scalding region (3) and the constant-speed scalding region (5) through the separating fence (2), interactions caused by different moving speeds of the carcasses at two sides during scalding is prevented. By redesigning the pool body and the pool cover, compared with the traditional scalding pools, the heat loss of the scalding pool of the present invention is reduced by about 80%. By using heat insulation materials, the energy consumption is greatly reduced.

The foregoing embodiments are only used for explaining the technical idea of the present invention, and are not intended to limit the protection scope of the present invention. Any changes based on the technical solution and according to the technical idea proposed by the present invention shall fall within the protection scope of the present invention. The technologies not involved in the present invention can be implemented by the existing technologies.

What is claimed is:

1. A novel pig body scalding system, comprising a scalding pool body, wherein a separating fence is provided at the middle of a scalding region in the scalding pool body and divides the scalding region into a high-speed scalding region and a constant-speed scalding region, two sides of the separating fence are provided with a high-speed scalding track corresponding to the high-speed scalding region and a constant-speed scalding track corresponding to the constant-speed scalding region, a starting end of the high-speed scalding track and a starting end of the constant-speed scalding track are capable of being connected with a same wobbling track, and the wobbling track is located at a tail end of a pig body hanging track, an infrared thermometer and pressure sensor connected with a control system is provided below the pig body hanging track, the infrared thermometer and pressure sensor measures a body temperature and a mass of a pig body hung on the pig body hanging track in real time and transmits the body temperature and the mass to the control system, and the control system drives the wobbling track to connect with the high-speed scalding track or the constant-speed scalding track through a control mechanism to make the pig body enter a corresponding scalding region to be scalded.

2. The novel pig body scalding system according to claim 1, wherein the high-speed scalding track, the constant-speed scalding track and the pig body hanging track are respectively driven by respective corresponding driving motors, and each of the driving motors is connected with the control system through a circuit.

3. The novel pig body scalding system according to claim 1, wherein at least three steam heating pipes provided with steam valves are distributed in the scalding region in the scalding pool body, a bottom of each of the steam heating pipes is provided with an immersed steam sprayer and is additionally provided with a muffler, and the steam valves are connected with the control system through circuits so that the control system is capable of controlling open degrees of the steam valves.

4. The novel pig body scalding system according to claim 3, wherein the steam heating pipes are sequentially disposed along front, middle and rear of the scalding region, the front and rear steam heating pipes are located in the high-speed scalding region, and the middle steam heating pipe is located in the constant-speed scalding region.

5. The novel pig body scalding system according to claim 4, wherein at least three groups of digital thermometers respectively connected with the control system are provided in the scalding pool body, the digital thermometers are distributed at same intervals in the scalding pool body, the digital thermometer in the high-speed scalding region is located between two steam heating pipes in the region, and the digital thermometers in the constant-speed scalding region are located at two sides of the steam heating pipe in the region.

6. The novel pig body scalding system according to claim 5, wherein the digital thermometers are dual-channel temperature recorders using k type wires as sensing probes, and temperature measuring sites of the digital thermometers are respectively located at a bottom of the scalding pool body and a surface layer of scalding water in the scalding pool body.

7. The novel pig body scalding system according to claim 1, wherein a tail end of the scalding pool body communicates with ahead end of the scalding pool body through a circulating water pipe provided with a circulating water pump, and a water flow direction in the circulating water pipe is identical to a moving direction of a scalded pig body, so that a water flow direction in the scalding pool body is opposite to the moving direction of the scalded pig body.

8. The novel pig body scalding system according to claim 7, wherein the circulating water pump uses a vertical pipeline hot water centrifugal pump with a flow rate of 1 to 1200 $m^3$ and a pump lift of 8 to 150 m, and the circulating water pump is connected with the control system through a circuit.

9. The novel pig body scalding system according to claim 1, wherein a scalding pool cover is provided on the scalding pool body, vacuum insulated panel (VIP) plates are embedded in the scalding pool body and the scalding pool cover to be used as dampproof heat insulation sandwich layers; access ways for the scalded pig body, and an operation space of the pig body hanging track and a transport track are reserved at two ends of the scalding pool cover.

10. The novel pig body scalding system according to claim 1, wherein the control system adopts a Siemens PLC with a model of S7-200.

* * * * *